United States Patent Office 3,293,905
Patented Dec. 27, 1966

3,293,905
FLASH-POINT DETECTOR FOR
PIPELINE OPERATION
Michael Ratway and Robert S. Wood, O'Hara Township,
Allegheny County, Pa., assignors to Gulf Research &
Development Company, Pittsburgh, Pa., a corporation
of Delaware
Filed Apr. 27, 1964, Ser. No. 362,721
3 Claims. (Cl. 73—36)

This invention relates to method and apparatus for detecting the flash-point of fuel, and in particular relates to a flash-point detecting method and apparatus of improved accuracy that is particularly advantageous in pipeline operation to monitor the passing of an interface between two transported fluids with respect to the flash-point of the pipeline fluid.

Many fuels are customarily identified by their flash-point which is always specified for any given fuel. The flash-point is the minimum temperature at which under specified standard conditions vapors of the fuel overlying the liquid fuel can be ignited with a specified standard type of ignition device. It is well known that the flash-point of diesel fuel is higher than that of kerosene which in turn is higher than that of gasoline. The flash-point is customarily determined in the laboratory by using a standardized amount of fuel in a standardized apparatus. In the prior-art flash-point determining apparatus the temperature of the fuel is gradually increased until a standard flame produces a flash at which point the fuel temperature is read. The apparatus is then cleaned and the test repeated for the next sample. This is evidently a time-consuming procedure that is not well adapted to automatic operation for control purposes because each time a flash occurs the apparatus must subsequently be substantially dismantled and cleaned out if reliable flash-point determinations are to be obtained. In an attempt to make automatic flash-point determinations an apparatus has been proposed through which the fuel flows continuously, as in United States Patent No. 2,627,745. Such apparatus is, however, susceptible to variation in observed flash-point because no reliable provision is made to scavenge the burned gases after a flash. In addition, such apparatus is not readily adaptable to monitoring a pipeline interface when the latter represents a transition from a fuel that has one flash-point to a fuel that has another flash-point. These and other shortcomings of prior-art apparatus are largely remedied in the apparatus of this invention.

In the operation of pipelines for the transport of liquid fuels it is customary to pump different types of fuels in succession through the pipeline. The so-called interface between two conterminously flowing miscible liquids gradually become diffuse so that instead of a sharp boundary at the "interface" there is a gradual transition from one liquid to the other. At a receiving station the physical and chemical characteristics of the pipeline liquid thus gradually change from that of the leading liquid to that of the trailing liquid. If at the receiving station it is desired to switch the several liquids to different destinations, tanks, or the like, the operator is faced with the problem of determining the instant at which to make the switch or "cut." One basis for determining the cut-point is to sample the pipeline liquid arriving at the station and perform some physical test to identify the nature of the liquid. Such tests as specific gravity, dielectric constant, color, etc., have been employed. A physical characteristic that is especially desirable for such a test is flash-point for the reason that this is a characteristic of fuels whose significance is well understood in the art, especially by customers that use the fuel. On the other hand as previously indicated, the flash-point measurement as made in the prior art is not adaptable to automatic pipeline operation. This invention provides a method of monitoring passing of an interface between two conterminously flowing liquid fuels that is based on flash-point determination, but which is fast and accurate and adaptable to either automatic or manual pipeline switching operations.

Accordingly, it is an object of this invention to provide an automatic flash-point detecting apparatus of improved reliability and accuracy.

It is another object of this invention to provide an automatic flash-point detecting apparatus adapted to provide a reliable signal from which an operator can determine the cut-point in pipeline operation.

It is a further object of this invention to provide an automatic flash-point detecting method and apparatus that is capable of providing reliable indication of a transition from a fuel that has a high flash-point to one that has a low flash-point.

It is a further object of this invention to provide an automatic flash-point detecting method and apparatus that is capable of providing reliable indications of a transition from a fuel that has a low flash-point to one that has a high flash-point.

It is a further object of this invention to provide a flash-point detecting method and apparatus that provides a plurality of signal indications during passage of an interface between two conterminous fuels in a pipeline.

It is an ancillary object of this invention to provide a method of monitoring passing of an interface between a liquid fuel of high flash-point and a succeeding fuel of low flash-point in pipeline operation.

It is an ancillary object of this invention to provide a method of monitoring passing of an interface between a liquid fuel of low flash-point and a succeeding fuel of high flash-point in pipeline operation.

It is a still further object of this invention to provide a method and apparatus that is capable of indicating a plurality of points in a pipeline interface at which the interface liquid has different predetermined flash-points.

These and other useful objects are attained by the apparatus of this invention as described in this specification of which the drawings form a part and in which.

Figure 1:
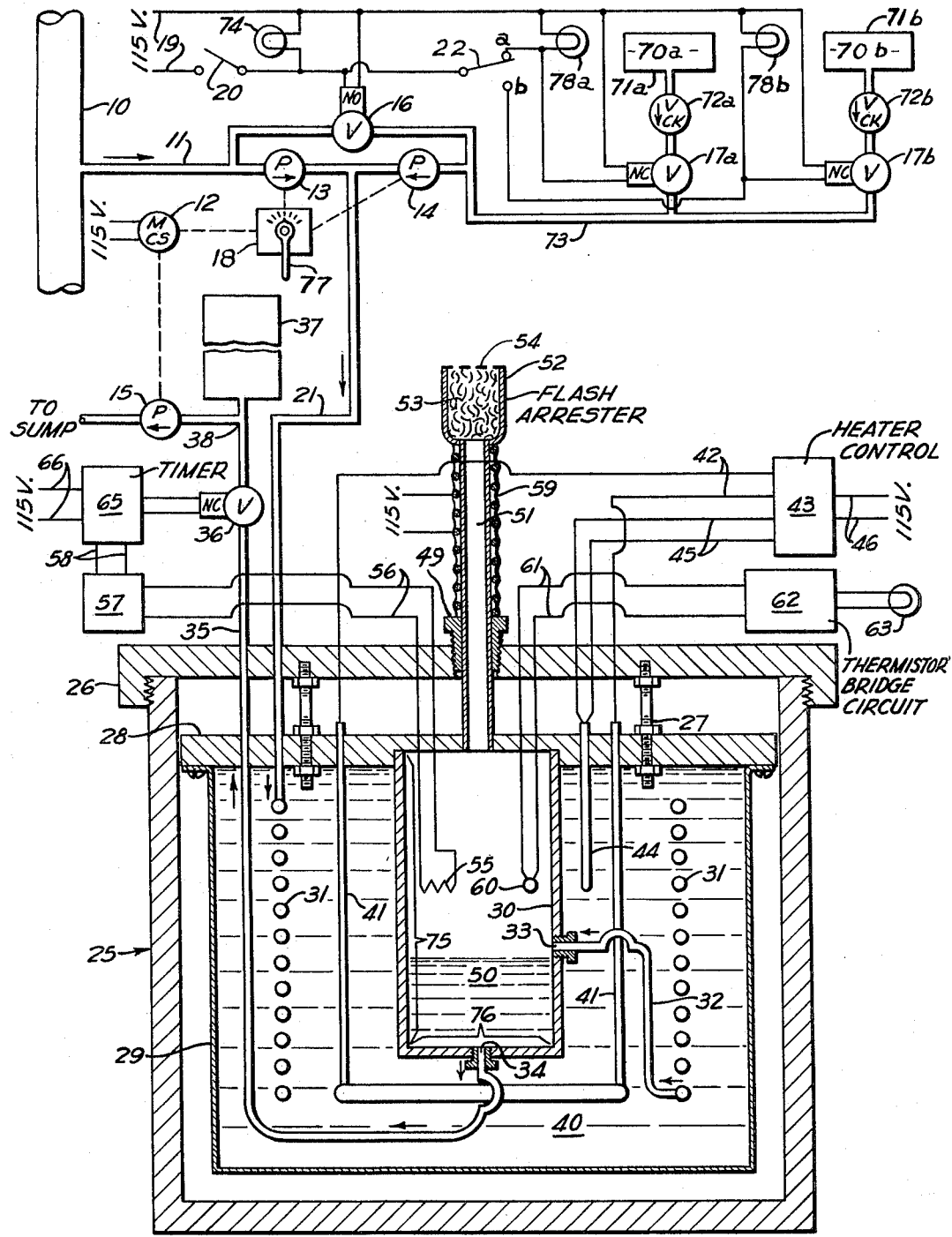
FIGURE 1 is a schematic diagram of the flash-point apparatus of this invention.

The apparatus of this invention comprises a flash-cup that is provided with a fuel entrance port and a fuel exit port. Fuel continuously enters the entrance port, but is only periodically withdrawn through the exit port. When the fuel is withdrawn, the air and gases in the flash-cup are also scavenged. In this manner the flash-cup is provided with fresh air for each accumulation of fuel on which a flash test is made so that the test closely approximates the standard ASTM flash-point test. At a predetermined interval just prior to withdrawal of liquid from the flash-cup an igniter is operated to ignite any vapors that will flash, a flash being detected by a sensitive temperature indicator. The entire apparatus is contained in a thermostated bath through which the entering fuel is fed to bring the latter up to the desired temperature. A timer controls the sequence of operations. In the method of this invention provision is made to blend with the incoming interface liquid a liquid fuel whose flash-point is higher than that of the interface component having the lower flash-point. The blending liquid is mixed with the interface liquid in such ratio as to raise the flash-point of the mixture to a value that is above the bath temperature. The temperature of the thermostated bath is adjusted to a value intermediate the flash-points of the two fuels in the pipeline between which a cut-point is to be established. The invention provides the pipeline operator with indications when the changing pipeline liquid in an interface attains different predetermined flash-points, whereby the invention monitors passing of the interface between the two fuels in the pipeline. By properly choosing the temperature of the thermostated bath, pipeline cuts can automatically be made with respect to the respective indications obtained by means of this invention.

In conventional flash-point measuring apparatus the sample is placed in a flash-cup and the temperature of cup and contents is slowly increased at a standard rate until the vapors flash when tested with a standard flame. This method is much too slow if repeated tests are to be made on a succession of samples in order to determine the cut-point between two fuels having different flash-points in a pipeline switching operation. In this invention the temperature of the flash-cup is maintained substantially constant by means of a thermostated bath and pipeline liquid is circulated therethrough, the temperature of the bath being intermediate the flash-points of the two interface components. In the method of this invention two or more signal indications are obtained regardless of whether the leading component has the higher or lower flash-point, thus materially increasing the reliability of the cut-point determination. In the ensuing description of this invention the novel apparatus will first be described in detail and followed by a detailed description of the novel method of using it in pipeline operation to monitor passing of the interface between two conterminous liquid fuels.

Referring to FIGURE 1, a tap 11 is connected to the pipeline 10 in order to withdraw a sample of the liquid flowing in the pipeline. A constant-speed motor 12 drives a plurality of pumps 13, 14, and 15. Pumps 13 and 14 are driven through an adjustable differential gear box 18 provided with a control handle 77 which adjusts the relative speeds of the pumps 13 and 14 while maintaining the sum of their speeds substantially constant. The pumps 13 and 14 are precision constant-volume pumps and are connected in a pipe network as shown including electrically actuated solenoid valves 16 and 17(a), 17(b). Pump 15 is of a type that has a much higher volumetric rate and that will pump either liquid or gas and it need not be of a precision type. The valve 16 is of a normally normally open type that is closed when electrically energized. Valves 17(a) and 17(b) are of a normally closed type that is open when energized. Valves 16 and 17(a) or 17(b) are energized from the power source connected to terminals 19 and are controlled by switch 20, a selected one of valves 17(a) or 17(b) being under control of switch 22.

For the immediately ensuing description it will be assumed that switch 20 is open and that valves 16 and 17 are not energized, so that valve 16 is open and valves 17 are closed. Accordingly, in this situation pumps 13 and 14 will withdraw a sample of pipeline liquid through tap 11 and the sample will flow through pipe 21 to be delivered to the flash-point apparatus generally indicated inside a casing 25. The apparatus illustrated in FIGURE 1 is located close to the pipeline itself so as to minimize time delay between withdrawal of a sample from the pipeline 10 and its delivery to the flash-point apparatus 25. It will be evident to those skilled in the art, however, that various indicator lights and control switches employed may be located at a control console or dispatcher's office if desired by employing well-known telemetering techniques.

The flash-point apparatus is contained in casing 25 that is screwed to a lid 26 and is generally of conventional explosion-proof construction. The lid 26 is provided with a plurality of studs 27 which support a platform 28 which serves as a mounting plate for the flash-point apparatus.

An outer metal cup 29 is fastened to the plate 28 as by means of a flange with a plurality of screws as shown. An inner metal flash-cup 30 is also fastened to the mounting plate 28 as by means of screw threads (not shown). A helix of small bore metal pipe 31 passes through a hole in the plate 28 and lid 26 and is connected at its upper end with the pipe 21. The lower end of the helical pipe 31 passes by means of pipe 32 into the inner cup 30 at an inlet opening 33. The inlet opening 33 is located in the side of the cup 30 at a point substantially above the bottom of cup 30 and preferably in the region between one-third and one-half way between the bottom and top of the cup 30. At the center of the bottom of cup 30 an outlet opening 34 is connected to the pipe 35, which passes through a hole in plate 28 and lid 26 to a normally closed solenoid-actuated valve 36 and pump 15. A closed container or tank 37 is connected by a T connection 38 to the pipe between the valve 36 and pump 15. Discharge from the pump 15 goes to a discard sump.

The outer cup 29 is filled with a liquid 40 having a high boiling point and that is employed as a constant temperature bath for the flash-point apparatus. The liquid bath 40 may be water when fuels having moderate flash-points are to be tested. The space between outer cup 29 and the inside of casing 25 may be packed with thermal insulation if desired. An electric heating element indicated schematically by 41 is immersed in the bath 40 and is connected by leads 42 to a heater control unit 43. A thermostat or temperature control element 44 is immersed in the bath 40 and is connected via leads 45 to heater control unit 43. The elements 41 to 45 are conventional means for maintaining the temperature of bath 40 at a constant predetermined value. The particular temperature to be employed will be explained later. Electrical energy for the heater and its control is derived from conventional house current over leads 46. The lid 26 is also provided with appropriate openings through which the various pipes and electrical leads are brought by means of seals or conduits to meet explosion-proof requirements.

It is apparent that the sample of pipeline liquid withdrawn through tap 11 by pumps 13 and 14 passes through pipe 21 and helix 31 in the thermostated bath 40 and thereby attains a temperature substantially the same as that maintained in the bath 40 by means of the thermostatic system. The length and diameter of the pipe in helical coil 31 is designed so that the liquid flowing therethrough attains the temperature of bath 40 to sufficient accuracy for all practical purposes. By way of example, the helical coil 31 may comprise twenty feet of ¼ inch I.D. copper tubing. A liquid flow rate of 135 cc./minute has been found satisfactory. The liquid whose flash-point is detected in the inner cup 30 is indicated in the figure by 50. The bath 40 also maintains the inner cup 30 and liquid 50 substantially at the predetermined temperature of bath 40.

Plate 28 is provided with an opening at its center into which is screwed a tube 51 provided at its upper end with a conventional flash arrester 52 containing metal wool or gauze 53 held in place by a perforated cover 54. The tube 51 provides access of air downward through the flash arrester 52 and tube 51 to the interior of cup 30. Also, when vapors in the cup 30 above liquid 50 are ignited, the tube 51 allows for expansion of the resulting burned gases. A compression fitting 49 provides a seal between tube 51 and lid 26. The tube 51 is wound with heater tape 59 connected to house current and arranged to maintain the tube 51 at a temperature that is approximately the same as that of bath 40 in order to preheat fresh air that is drawn into cup 30 through the tube 51.

Inside the flash cup 30 at a level higher than that reached by liquid 50 and preferably above the inlet opening 33, there is located an igniter 55 that is connected by means of leads 56 to an appropriate source of power 57. The igniter 55 may be of any conventional type, as for example a sparking plug connected to a high-tension supply 57 or an incandescent filament energized from a low-voltage power source 57. The ignition source 57 for the igniter 55 is periodically energized by connection through leads 58 to a timer 65 whose cycle will be described later. It is apparent that with a sample 50 in the cup 30 the overlying vapors may be periodically tested for flash by energization of the igniter 55. If a flash occurs, there will be substantial rise in temperature of the gases inside the cup 30, and such temperature rise will be detected by means of a flash detector comprising temperature-sensitive element 60 connected by means of leads 61 to a conventional indicator circuit 62 that is provided with a visual or other type of indicator such as signal lamp 63. The element 60 may conveniently by a conventional thermistor connected to a bridge circuit 62 which in conventional manner indicates a small temperature rise by energization of indicator lamp 63. In this manner lamp 63 will momentarily light as a signal each time a flash occurs.

By way of example, a cylindrical flash cup 30 having an inside diameter 76 of two inches and a height 75 of five inches has been found satisfactory. As previously indicated, the inlet opening 33 is located between one-third and one-half way from the bottom of the cup and may, for example, be two inches from the bottom. The igniter 55 is located in the upper portion of the cup 30 so as to always be above the level of liquid 50 and is preferably at least one inch above the maximum level attained by liquid 50. Thus if the latter does not rise above the level of inlet opening 33, the igniter 55 may be one inch above the opening 33. The diameter of pipe 51 is such as to allow free access of air when the cup is purged, and may, for example, have an inside diameter of ¾ inch. The flash detector 60 employed for detecting flash may, for example, be a Type 31E9 thermistor made by Victory Engineering Corporation, Springfield, New Jersey, U.S.A. The thermistor 60 is located to always be above the level of liquid 50. Preferably the thermistor 60 is located near a side of the cup diametrically opposite to the location of igniter 55 and at about the same level in the cup as igniter 55.

The timer 65 which derives power from house current on leads 66 periodically energizes the ignition source 57 and at a different time periodically energizes normally closed solenoid valve 36 thereby to open valve 36. It is apparent that with solenoid valve 16 open and valves 17 closed, and with pumps 13 and 14 running continuously, fuel will be pumped into the cup 30 at a uniform continuous rate. Valve 36 is normally closed so that continuously running pump 15 will evacuate liquid and gas from tank 37 to produce therein a low pressure. Operation of the timer 65 is arranged to allow the liquid 50 to accumulate in cup 30 until it reaches a level proximately below the inlet opening 33 after which the timer energizes the ignition source 57 thereby energizing igniter 55 to test the vapors above liquid 50 for possible flash. The timer 65 is arranged so that a short time interval subsequent to a flash test the timer energizes and thereby opens valve 36, thereby connecting the interior of cup 30 to the tank 37. The volume of tank 37 (not to scale in the drawing) is substantially greater than the combined volume of cup 30, pipe 35, tube 51, and flash arrester 52, so that when valve 36 opens, all of the liquid and vapor contents of cup 30 are withdrawn into the tank 37. The valve 36 remains open a sufficient time to permit complete withdrawal of the contents of pipe 35, cup 30, pipe 51, and flash arrester 52 and also to draw fresh air into cup 30, after which valve 36 is de-energized and closes. Continuously running pump 15 then removes the contents from tank 37 and again evacuates the tank so that it is ready to repeat the cycle. It is further apparent that with pumps 13 and 14 running continuously the cup 30 will gradually fill to a level proximately below the opening 33 whereupon the vapors will be tested for ignition. Subsequently, both the liquid and vapor contents of cup 30 are completely scavenged and the cup 30 is purged with fresh air. The relative volumetric rates of pumps 13 and 14, as compared to that of pump 15 and the capacity of tank 37, are arranged so that evacuation of the cup 30 takes place rapidly compared to the flow of liquid into the cup 30 through pipe 32. In this way the cup 30 is emptied of liquid and flushed with air at regular intervals between which the cup is allowed to accumulate liquid 50. In this manner each batch of liquid 50 is also provided with a fresh charge of air and this insures that a reliable flash-point measurement is made by the apparatus of this invention. The flash test by energization of igniter 55 is made just prior to opening of valve 36 so that the flash test is made on each batch of liquid introduced into the cup 30. As previously mentioned, the occurrence of a flash is indicated by signal lamp 63.

By way of example, the following timing cycle has been satisfactorily employed when operating with conventional petroleum type fuels. The cycle starts at zero time when valve 36 is de-energized. The continuously running pumps 13 and 14 are designed so that together they fill cup 30 with liquid to a height of about one-third full in about forty seconds. In the meantime continuously running pump 15 has evacuated tank 37. At forty seconds the timer 65 energizes ignition source 57 to energize the igniter 55. If a flash takes place, the operator is apprised of this fact by flashing of signal lamp 63. At forty-five seconds the timer energizes valve 36 which opens, whereupon the liquid 50 plus any vapors in the elements 51 and 52 are sucked into the tank 37 and cup 30 is filled with fresh air through pipe 51. Complete scavenging of cup 30 takes about fifteen seconds, so that at sixty seconds valve 36 is again de-energized and closes. Subsequently, the cycle is continuously repeated. It is apparent that the cycle should be relatively short compared to the time required for an interface to pass the location of tap 11 in order that a substantial number of flash tests be made during passing of the interface. Passing of an interface commonly takes from thirty to one-hundred twenty minutes, and a cycle period in the range between thirty and sixty seconds has been found satisfactory.

In order to detect more than one flash-point the invention provides for blending with the interface sample entering through tap 11 one or more respective liquids 70, such as 70(a), 70(b), etc., whose flash-points have known values to be explained later. Each liquid 70 is contained in a closed tank 71, such as 71(a), 71(b), etc., having an outlet provided with one of previously mentioned solenoid valves 17. Each tank 71 also has a vacuum breaker (not shown) at its uppermost point in order to admit air as liquid is withdrawn from the tank. A check valve 72, such as 72(a), 72(b), etc., at the outlet of each tank permits flow of the respective liquid 70 into manifold pipe 73. In the system connected as shown in FIGURE 1, when switch 20 is closed, the valve 16 closes and a selected one of the valves 17 opens. The pump 14 thereafter pumps the selected liquid 70 from pipe 73 into the pipe 21, while pump 13 pumps sample from tap 11 into pipe 21. However, the total flow through pipe 21 remains substantially the same as when switch 20 is open. Thus with switch 20 closed, the liquid in line 21 which enters the flash-point apparatus is made up of pipeline sample blended with a predetermined fixed percentage of the liquid 70. Thus the operator by opening switch 20 can cause sample alone to flow into the flash-point apparatus, or by closing switch 20 the operator can cause a predetermined mixture of sample and selected blending liquid 70(a) or 70(b) to enter the flash-point apparataus, with the respective rates of total liquid flow in pipe 21 being substantially the same in each case. It is apparent that the blending ratio will depend on the relative volumetric rates of pumps 13 and 14. The blending liquid 70 may be any liquid which when mixed with the interface component having the lower flash-point will raise the flash-point of the mixture to a value that is above the temperature of bath 40.

For reasons that will become evident later, it may be desirable to employ more than one blending ratio during passing of an interface or for monitoring different types of interfaces, and for this purpose it is convenient to drive one or both pumps 13 and 14 through the previously described adjustable gear box 18 having control handle 77. By this means the operator may select the blending ratio desired. It may also be desirable to employ different blending liquids such as 70(a) or 70(b) in monitoring different types of interfaces or during passing of an interface, and for this purpose additional tanks 71 may be provided, each tank 71 containing a different blending liquid 70. Each tank 71 is equipped with a check-valve 72 and a normally closed solenoid valve 17. The operator may thus select the desired blending liquid 70(a), 70(b), etc. by means of the selector switch 22. An indicator light 74 is provided to monitor when blending is being performed, and separate indicator lamps 78(a), 78(b), etc. indicate which respective blending liquid is being used.

With the timer 65 running and pumps 13, 14, and 15 running, and switch 20 open, the operator can tell whether or not the pipeline sample alone flashes at the temperature to which the thermostat 44 is adjusted. On the other hand by closing switch 20 the operator can tell whether the predetermined blend will flash at the temperature to which the thermostat 44 is adjusted. The nature of the blending liquid 70 and the temperautre to which the thermostat 44 is set for the respective types of interface detection will become evident later.

Two kinds of transitions of the flash-point of pipeline liquids commonly occur at interfaces, namely from a liquid of high flash-point (usually having a low vapor pressure) to a liquid of low flash-point (usually having a high vapor pressure), and vice versa. In making cuts the pipeline operator may monitor passing of the interface by periodically sampling the pipeline liquid and testing the sample for some characteristic physical or chemical property. For example, when testing the specific gravity of the pipeline liquid, there will be gradual change from the gravity of the leading component of the interface to that of the trailing component. A similar transition in flash-point occurs. It is customary for the pipeline operator to cut the transported product at two or more points in the interface. For example, when fuel oil is followed by gasoline, a high cut may be made soon after the gravity of the pipeline sample starts to fall, at which point the interface liquid is switched to a heavy-end tank. Somewhat later a middle cut may be made at about the middle of the interface, when the interface liquid is switched to a light-end tank. Finally at the end of the interface a low cut is made at which point the liquid is substantially all gasoline and is again appropriately switched. While various pipelines may make cuts or switches at various selected points along an interface depending on whether or not buffer liquids are inserted between batches, the method of using the invention will become clear by the ensuing description base on the three above-mentioned cuts.

Because the flash-point of gasoline is below room temperature, it is impractical to attempt to make the above-mentioned low-cut switch with respect to a flash-point measurement. However, it is desirable to make the middle and the high cuts with respect to flash-point. By way of example, it will be assumed that the pipeline operator desires to make the high cut when the interface liquid attains a flash-point of 120° F. and further desires to make the middle cut when the interface liquid attains a flash-point of 65° F. It is, however, not practical to change the temperature of the bath 40 since there is insufficient time for the bath to reach temperature equilibrium. In employing this invention the temperature of the bath 40 is set at the high-cut temperature, i.e. 120° F., so that the point in the interface where the pipeline sample attains this flash-point is directly observed. Lower flash-points of interface liquid are detected by blending with the interface sample a predetermined proportion of a high flash-point blending liquid 70 and indirectly detecting ability of the sample to flash at the lower temperature by detecting flash of the predetermined blend at 120° F. Thus the 65° F. cut-point is indicated when the blend attains a flash-point of 120° F.

The method of using the blending operation to monitor the changing flash-point and/or to detect when the flash-point of the interface sample reaches more than one preassigned value will be described first, by way of example, with reference to an interface such as occurs when fuel oil is followed in the pipeline by gasoline. It is known that commerical No. 2 fuel oil, for example, has a flash-point in the range between 145° F. and 165° F., and that the flash-point of gasoline is considerably below room temperature. As indicated above, the pipeline operator may decide to make three cuts, with the high cut at a flash-point of 120° F., the middle cut at a flash-point of 65° F., and the low cut with respect to gravity, i.e. at this point at which no further reduction in specific gravity of pipeline liquid occurs. Accordingly, the thermostat 44 for bath 40 is set at a temperature of 120° F. Switch 20 is initially open. Thus at first, when the pipeline sample is 100 percent fuel oil, no flash will occur because the liquid 50 in cup 30 has a flash-point higher than the bath temperature. As the interface progresses and the interface sample begins to contain an appreciable amount of admixed gasoline, the sample will begin to flash and this will be indicated by intermittent flashing of signal light 63. The time when flashing starts is noted by the operator who may initiate a switching operation after he has observed a sufficient number of flashes to be assured that flashing has actually begun. This will be the above-mentioned high cut. It is apparent that by employing appropriate well-known relay circuits in the place of signal light 63 the initiation of flashing can be made to automatically effect the desired switching operation.

The operator then closes switch 20 to start blending with a previously prepared liquid 70, as for example liquid 70(a) which is selected by placing switch 22 in position (a). The blending liquid is any liquid which when mixed with the gasoline will raise the flash-point of the mixture to a value above the temperature of bath 40. It is convenient to simply employ some of the liquid forming the interface component that has the higher flash point, which in this case is fuel oil. Accordingly, blending liquid 70(a) is fuel oil. The blending ratio as controlled by handle 77 is predetermined, and is the ratio such that an interface sample having a flash-point of 65° F. (at which the middle cut is to be made) when mixed with fuel oil in the ratio proportions will result in a mixture whose flash-point is at the temperature of bath 40, i.e., at 120° F. The required blending ratio is easily determined beforehand by trial. By way of example it has been found that a mixture of about 84 percent fuel oil blending liquid (whose flash-point is about 145° F.) with about 16 percent interface liquid having a flash-point of 65° F. (which is itself a mixture of fuel oil and gasoline) will have a flash-point of 120° F.

Immediately after switch 20 is closed, the liquid 50 will not flash because the flash-point of the mixture is above 120° F. (the temperature of bath 40). However, as the gasoline content of the interface liquid further increases, the liquid 50 eventually begins to flash. At this time the operator knows that the interface liquid has a flash-point of 65° F. and he may use this as the cut-point for the above-mentioned middle cut.

Figure 2:
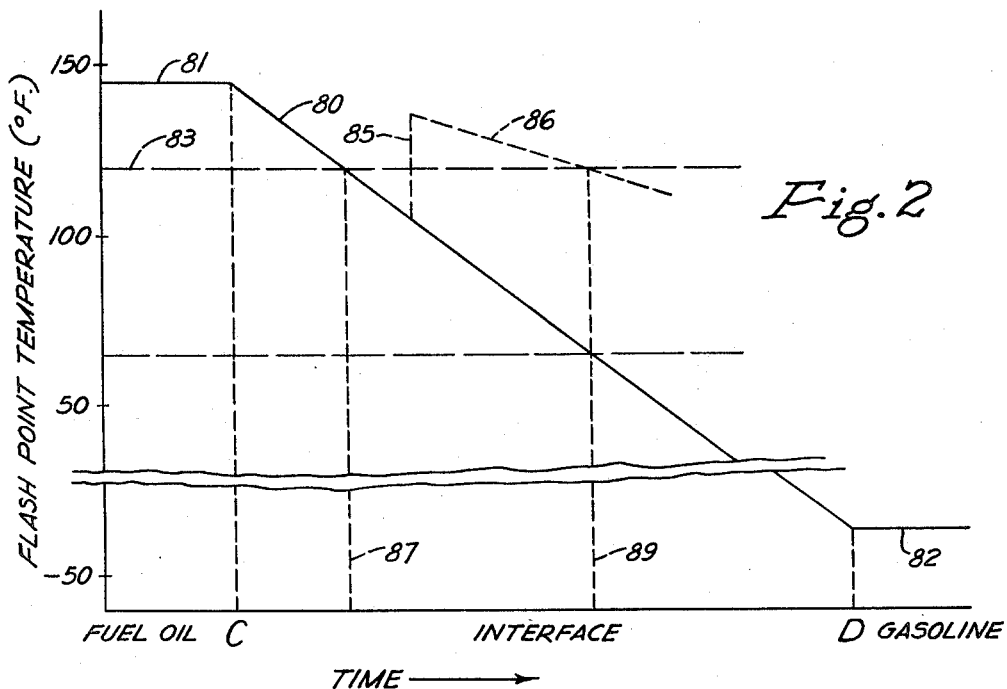
FIGURE 2 is an idealized diagram illustrating application of the method of this invention to an interface between fuel oil followed by gasoline.
Figure 3:
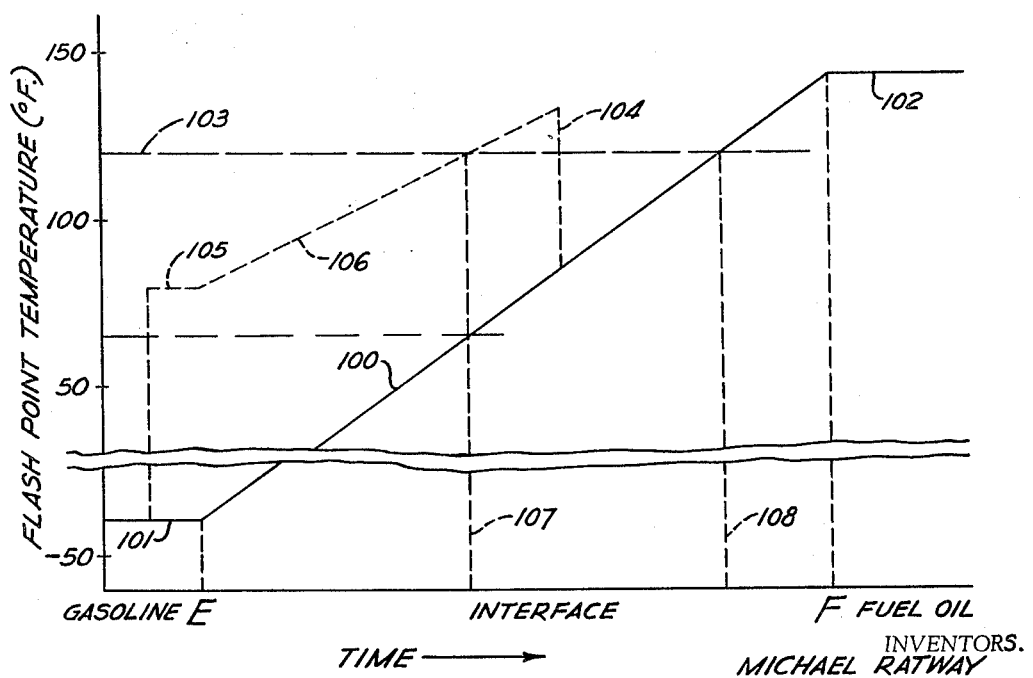
FIGURE 3 is an idealized diagram illustrating application of the method of this invention to an interface between gasoline followed by fuel oil.

The method of this invention may be better visualized by reference to FIGURE 2 which is an idealized plot of flash-point against time. The pipeline liquid passing the pipeline location of the tap 11 (FIGURE 1) prior to time C is 100 percent fuel oil. Subsequent to time C and up to time D the pipeline will contain interface liquid which is a mixture of fuel oil and gasoline. Subsequent to time D the pipeline liquid will be 100 percent gasoline. The curve 80 (FIGURE 2) is a plot of the transition of flash-point of these liquids during the interface. Prior to time C the liquid sample withdrawn from the pipeline by tap 11 will have a high flash-point as indicated by the curve at 81. Subsequent to the time D the pipeline sample will have a much lower flash-point as indicated by the curve at 82. (A discontinuity is shown in the plot of FIGURES 2 and 3 at low temperatures because of the very low flash-point of gasoline, the latter being only schematically indicated.) During the interface interval, i.e., between the times C and D, the flash-point of the pipeline sample gradually changes from the value 81 to the value 82. The bath 40 (FIGURE 1) is adjusted to have a temperature below the flash-point of fuel oil, as for example the previously mentioned temperature 120° F. indicated by line 83 in FIGURE 2. It is apparent that above the line 83 no flashing occurs because the flash-point of liquid 50 is above the temperature of bath 40. In the region immediately below the line 83 flashing will occur. Accordingly, as the flash-point of the pipeline liquid gradually drops from 81 as indicated by the curve 80, flashing begins when the curve 80 crosses the line 83. Shortly after this time, the operator closes switch 20 and blending is started. The blending liquid 70(a) is fuel oil. The flash-point of the liquid 50 now jumps up as indicated by the dotted line 85 so that the liquid 50 now does not flash. As the pipeline liquid continues to contain an increasing percentage of gasoline, the blended liquid 50 follows the dotted curve 86 which is roughly parallel to but not as steep as the curve 80. When the curve 86 crosses line 83, flashing again begins. It is seen from FIGURE 2 that flashing starts at the time 87, stops when blending is started at 85 and flashing starts again at the time 89. The times 87 and 89 are noted by the operator, or if desired, the current through signal light 63 may be automatically recorded on a chronograph in well-known manner for future reference. The operator has thus had a plurality of signals from which to gauge the switch, which in itself may require many minutes to complete because of the time required for motor-actuated valves to open and close. The apparatus thus monitors passing of the interface by a plurality of flash-point signals, namely, first flashing of signal lamp 63 indicating that the flash-point of the interface liquid has fallen to 120° F., and a second flashing indicating that the flash-point of the interface liquid has fallen to 65° F. If desired, other flash-points can be monitored in similar manner. The operator may in well-known manner make the pipeline switch at an appropriately chosen time related to the times 87 and 89 indicated by the flash-detecting apparatus of this invention or may employ the flash signals to automatically effect the cuts. Ordinarily considerable time is required for the interface to traverse the location of tap 11 and actual switching may take place at some distance downstream from the tap 11 so that the operator will have ample time to make the switch at the chosen point on the interface. If desired, the switching can be initiated automatically by means of a relay sequence that for safety requires two or more flashes for operation in well-known manner.

The operator can by experiment devise more than one blending liquid 70, or more than one blending ratio, and can thus by changing blending fluid 70 or by changing the volumetric ratio of pumps 13 and 14 obtain additional flash-point signals corresponding to any desired series of flash-points of the interface liquid if further signals are desired for monitoring purposes or to make additional cuts. This invention permits doing this without changing the temperature of bath 40. In this manner the invention provides a method and means for obtaining a plurality of signals based on the flash-point of the pipeline liquid as the interface progresses, whereupon the operator can be sure that the desired cuts or switches are made at the desired points of the interface.

The method of using the blending operation to obtain a plurality of flash-point indications for cut-point determinations when a liquid of low flash-point (high vapor pressure) is followed by a liquid of high flash-point (low vapor pressure) as for example, when gasoline is followed by fuel oil, is similar to a reverse of the above-described procedure. The thermostat 44 is first set so that the bath 40 will have a temperature intermiate the flash-points of fuel oil and gasoline, for example the bath 40 may be set at a high-cut point of 120° F. The switch 20 is initially closed so as to blend liquid 70 with the pipeline gasoline with such a blending ratio that the mixture will flash at the bath temperature, i.e. 120° F. This mixture 50 will flash, but as the interface progresses and the gasoline content of the interface decreases, the flash-point of the blended mixture 50 eventually rises to above 120° F., whereupon flashing ceases and signal light 63 no longer indicates flashing. The time when flashing stops is noted by the operator and may be employed as an intermediate cut-point. The operator now opens switch 20 to discontinue addition of blending liquid. The interface liquid 50 is now so rich in gasoline that flashing takes place again. As the gasoline content of the interface further decreases, the vapors eventually again cease to flash as indicated by cessation of flashing of signal light 63, at which point the pipeline liquid is mostly all fuel oil whose flash-point is above 120° F.

FIGURE 3 diagrammatically illustrates the above-described procedure when gasoline is followed by fuel oil in the pipeline. Curve 100 shows the transition of flash-point of pipeline liquid with time as the interface progresses past the location of tap 11. Prior to time E the liquid drawn off by tap 11 is all gasoline having a low flash-point. Between times E and F the interface liquid has a gradual transition from low flash-point to high flash-point. Subsequent to time F the pipeline liquid is all fuel oil having a high flash-point. Prior to time E the flash-point of the gasoline is indicated by the curve at 101 and subsequent to time F the curve 100 indicates at 102 the flash-point of fuel oil. The bath 40 is set at an intermediate temperature, preferably at the temperature corresponding to the flash-point of the high cut, such for example as 120° F. indicated by line 103. As previously explained, the region above line 103 represents conditions under which no flashing takes place because the flash-point of the liquid 50 (FIGURE 1) is higher than the setting of bath 40. In the region below the line 103 flashing takes place. Prior to the time E the operator closes switch 20 (FIGURE 1) to start blending the pipeline sample with blending liquid 70(a) which may be fuel oil. The blending is such as to raise the flash-point of the liquid 50 to a higher value 105 but which is less than the temperature 103 of bath 40. The blended liquid 50 flashes because its flash-point is below the line 103. At the time E the gasoline content of the interface liquid starts to fall whereupon the flash-point of liquid 50 follows the dotted curve 106 which is roughly parallel to curve 100 but not as steep. At the intersection of the curve 106 and line 103 flashing ceases because the mixture 50 attains a flash-point that is above the temperature of bath 40, i.e. above 120° F. If as in the previous example the blending liquid 70(a) is fuel oil and the blending ratio is 84 percent fuel oil blending liquid and 16 percent interface liquid, the cessation of flashing indicates that the interface liquid has attained a flash-point of 65° F. The operator may use this point as the abovementioned intermediate cut-point.

The operator then discontinues blending by opening switch 20, whereupon the flash-point of liquid 50 abruptly drops as indicated by dotted line 104 and subsequently follows curve 100. The liquid 50 flashes upon opening switch 20. However, as the curve 100 crosses the line 103, flashing again ceases because the interface liquid will not flash at 120° F. The operator is thus provided with signals, namely at the time 107 when flashing first ceases, and the time 108 when flashing again ceases. These times are all noted by the operator, or if desired, the current through signal light 63 may be automatically recorded on a chronograph in well-known manner for future reference, or the signals may be employed to automatically initiate switching operations. The operator thus has a plurality of signal indications apprising him of passage of the interface, namely cessation of flashing at time 107 as the flash-point of the interface liquid exceeds 65° F., and a second cessation of flashing at time 108 as the flash-point of the interface liquid exceeds 120° F. It is apparent that if additional indications representing intermediate flash-points are considered desirable such can be obtained by successively employing other appropriately designed blending liquids or blending ratios. The operator can in this manner monitor progress of the entire interface as it passes, thus greatly improving the reliability of the respective cut-points. Furthermore, the operator can make the pipeline switches at times that are related to the successive beginnings or endings of flashing, and this improves the switching efficiency and avoids wasteful discard at the time of switching.

It is preferred that the blending liquid 70 be a fuel of a type that is miscible in all proportions with both of the pipeline liquids involved in the interface. Inasmuch as most fuels are petroleum hydrocarbons which are mutually miscible, it is convenient to also use a hydrocarbon blending liquid. The blending liquid may itself comprise a blend of appropriate liquids as required to obtain the desired properties. It is preferred to use as blending liquid the interface component that has the higher flash-point.

It will be evident that the blending liquid composition and the blending ratio must be such that the gradual transition of flash-point of the interface liquid is successively modified so that the successive mixtures forming liquid 50 in the flash-cup 30 will have flash-points that repeatedly traverse the temperature to which the bath 40 is set. Accordingly, the blending parameters and the thermostat 44 setpoint temperature are appropriately chosen.

The invention has been described by way of example as employed to obtain a high-cut point and an intermediate cut-point, but it is apparent that still lower flash-points may be detected by employing other blending ratios. Thus if a flash-point below 65° F. for the interface liquid is to be detected, the operator may move handle 77 to change the gear ratio between pumps 13 and 14 to obtain a blending ratio such that the mixture of interface liquid having such lower flash-point will when mixed with liquid 70 flash at 120° F. Thus with the new blending ratio the mixture will not flash when liquid 50 contains little gasoline, but as the gasoline content of the interface liquid increases, flashing will eventually take place, indicating that the interface liquid has now reached the lower flash-point. It may also be desirable to employ a different blending liquid such as 70(b) in which case the operator moves switch 22 to position (b). The blending liquid and the blending ratios employed are predetermined by experiment as will be apparent to those skilled in the art of blending fuels.

It is to be noted that the respective flash-points are detected in this invention without changing the temperature of bath 40. By way of example, a satisfactory bath temperature for use with interface between gasoline and fuel oil (or vice versa) is in the range 120° F. to 130° F. It is apparent that the temperature of bath 40 must be intermediate the flash-points of the pipeline liquids whose interface is to be monitored. In selecting the temperature of bath 40 the operator may take into account the fact that the flash-point as detected by the apparatus of FIGURE 1 may not coincide with that determined by conventional standard ASTM apparatus. Additionally the operator may also in adjusting the thermostat 44 take into account any thermal lag that arises if the liquid 50 does not quite attain the temperature of bath 40 during its transit through helical pipe 39. These differences may easily be determined by a simple calibration test of the apparatus of FIGURE 1.

What we claim as our invention is:

1. Apparatus for monitoring at a fixed location passing of an interface between two liquids of different flash-points flowing conterminously in a pipeline which comprises means for sampling at a constant volume rate the liquid flowing past the fixed location in the pipeline, a source of known liquid having a flash-point higher than that of the two pipeline liquids with the lower flash-point, mixing means connected to said source and to said sampling means continuously mixing said known liquid with said sample in a predetermined volumetric ratio, a flash-cup having an inlet connection and a drain connection, flow means connecting said mixing means to said inlet connection and including means to heat the liquid mixture to a predetermined temperature intermediate the flash-points of the pipeline liquids, flash-ignition means in said flash-cup located above the level of the liquid sample in said flash-cup and adapted to be periodically energized, flash-detection means in said flash-cup located above the level of the liquid sample in said flash-cup, means connected to said flash-detection means indicating occurrence of a flash, withdrawal means connected to said drain connection and periodically energized to withdraw the liquid and vapor contents of said flash-cup through said drain connection, and a timer connected to said flash-ignition means and to said withdrawal means and adapted to respectively energize said flash-ignition means and said withdrawl means at predetermined time intervals.

2. A method of monitoring at a fixed location passing of an interface between a liquid of low flash-point followed conterminously in a pipeline by liquid of high flash-point which comprises substantially continuously sampling the pipeline liquid at the fixed location, heating said sample to a predetermined temperature intermediate the flash-points of the two pipeline liquids, mixing with the sample a predetermined fraction of a known liquid having a flash-point higher than that of the two pipeline liquids with the lower flash-point detecting the substantially continuous flashing of said mixture at said predetermined temperature, determining the instant when said mixture ceases to flash at said predetermined temperature, discontinuing said mixing, thereby causing said sample to again flash, and determining the instant when said sample ceases to flash at said predetermined temperature whereby said instants provide a basis for determination of the passage of said interface.

3. A method of monitoring at a fixed location passing of an interface between a liquid of a high flash-point followed conterminously in a pipeline by a liquid of low flash-point which comprises substantially continuously sampling the pipeline liquid at the fixed location, heating said sample to a predetermined temperature intermediate the flash-points of the two pipeline liquids, determining the instant when the sample begins to flash at said predetermined temperature, mixing with the sample a predetermined fraction of a known liquid having a flash-point higher than said predetermined temperature thereby causing said mixture to cease flashing, and determining the instant when the mixture begins to flash at said predetermined temperature whereby said instants provide a basis for determination of the passage of said interface.

References Cited by the Examiner

UNITED STATES PATENTS

| | | | |
|---|---|---|---|
| 2,627,745 | 2/1953 | Matteson | 73—36 |
| 2,971,365 | 2/1961 | Rhodes et al. | 73—36 X |
| 2,971,370 | 2/1961 | Jacobs et al. | 73—36 |
| 2,974,519 | 3/1961 | Rhodes et al. | 73—36 |
| 3,145,561 | 8/1964 | Thompson | 73—36 X |
| 3,186,213 | 6/1965 | Donnell | 73—36 |

RICHARD C. QUEISSER, *Primary Examiner.*

J. FISHER, *Assistant Examiner.*